United States Patent
Cho et al.

(10) Patent No.: US 7,219,361 B2
(45) Date of Patent: May 15, 2007

(54) TRAY OF OPTICAL DISK PLAYER

(75) Inventors: Won Hyung Cho, Seoul (KR); Wae Yeul Kim, Gyeonggi-Do (KR); Nam Woong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 495 days.

(21) Appl. No.: 10/740,153

(22) Filed: Dec. 17, 2003

(65) Prior Publication Data

US 2004/0133900 A1      Jul. 8, 2004

(30) Foreign Application Priority Data

Dec. 18, 2002    (KR)    ............. 10-2002-0081454

(51) Int. Cl.
    *G11B 7/24*    (2006.01)
(52) U.S. Cl. ........................... 720/718
(58) Field of Classification Search ............... 720/718, 720/601, 603; 361/690; 705/400
    See application file for complete search history.

(56) References Cited

U.S. PATENT DOCUMENTS

| | | | |
|---|---|---|---|
| 5,761,651 A | * | 6/1998 | Hasebe et al. .............. 705/400 |
| 6,122,240 A | * | 9/2000 | Kim .......................... 720/603 |
| 6,370,101 B1 | * | 4/2002 | Kim .......................... 720/603 |
| 6,496,464 B1 | | 12/2002 | Yamauchi et al. ......... 369/77.1 |
| 6,817,021 B1 | * | 11/2004 | Miyasaka et al. ........... 720/603 |
| 6,831,833 B2 | * | 12/2004 | Kim et al. .................. 361/690 |
| 7,051,345 B2 | * | 5/2006 | Ohgaki ....................... 720/603 |

FOREIGN PATENT DOCUMENTS

| | | |
|---|---|---|
| EP | 1 174 873 A3 | 1/2002 |
| KR | 9838638/2000-0020166 * | 4/2000 |

* cited by examiner

*Primary Examiner*—Tianjie Chen
(74) *Attorney, Agent, or Firm*—Lee, Hong, Degerman, Kang & Schmadeka

(57) ABSTRACT

A tray of an optical disk player including a disk mounting portion on which an optical disk is stably mounted; a front wall formed on the front to surround the disk mounting portion; a rear wall formed on the rear of the tray to surround the disk mounting portion, the front wall is formed to have a distance from the center of a spindle to the front wall not less than a value obtained by adding 2.75 mm to a radius of a large-sized disk and not greater than a distance from the center of the spindle to a tray front end. In the tray, by increasing a flutter occurrence speed, although the optical disk player has a high recording/reproducing speed, occurrence of flutter can be prevented, and accordingly it is possible to reduce error in disk reproducing/recording and prevent noise occurrence and wrong operation.

8 Claims, 5 Drawing Sheets

TRAY OF OPTICAL DISK PLAYER

BACKGROUND OF THE INVENTION

1. Field of the Invention

The present invention relates to a tray of an optical disk player, and in particular to a tray of an optical disk player capable of preventing flutter having a bad influence upon recording and reproducing in high speed rotation.

2. Description of the Related Art

Recently, researches on developing an optical disk player having an operational speed not less than 10000 rpm and a fifty-two times speed have been proceeded, recording/reproducing speed of other disks of a CD group or a DVD group have been improved continually. Accordingly, several mechanical problems related to the high-times speed trend of the optical disk reproducing apparatus have been occurred, and a countermeasure for them have been required.

When a disk is rotated in the air, the disk may vibrate by variable mass unbalance or the air.

When a rotational speed is not greater than a specific speed, because an air flow may act as an irregular excitation source, resonance may occur not by the air but by variable mass unbalance of the disk. However, when a rotational speed is riot less than a specific speed, because a disk is strongly coupled to the air, although variable mass unbalance does not exist, severe unbalance may occur in frequencies regardless of the rotational speed. Herein, vibration of the disk coupled to the air is called flutter, and the specific speed is called a flutter speed.

In the operation of the disk player, the flutter makes a head or a pickup of the disk player not follow a signal track on the disk accurately in reproducing/recording, and accordingly incorrect information may be reproduced/recorded.

Scientific researches on the flutter have been performed in relation to a hard disk. A method for attenuating flutter phenomenon by changing a channel and improving a structure of a hard disk was disclosed in Korea Patent No. 2001-0053127 and Korea Patent No. 2001-0064503. In addition, a method for preventing flutter by increasing strength of an optical disk by fabricating the optical disk by a specific fabrication method and generating residual stress inside a disk medium was disclosed in Korea Patent No. 1999-0001808.

However, in case of a hard disk, flutter can be prevented in advance in the early stage of production by fabricating a disk and an enclosure precisely. However, in case of an optical disk, because of floods of manufacturers, inferior disks in which modulus of elasticity is remarkably low and thickness thereof is thin are circulated in the market, and accordingly flutter may occur at a low rotational speed. Accordingly, an optical disk player has to be capable of preventing flutter in a random disk.

FIG. 1 is a perspective view illustrating an optical disk player in accordance with the conventional art.

The conventional optical disk player includes a tray main body 11 consisting of the tray front end 11a, the tray rear end 11b and the top tray 11c; a large-sized disk mounting portion 20 depressed on the top tray 11c centering around the center of a spindle 25 as a concentric circle; a small-sized disk mounting portion 23 depressed on the large-sized disk mounting portion 20; and a spindle opening 24 pierced-formed on the tray top surface 11c so that a optical pick-up (not shown) can approach to the disk.

A front wall 21 is formed on the front of the large-sized disk mounting portion 20, and a rear wall 22 is formed on the rear of the large-sized disk mounting portion 20.

FIG. 2 is a schematic plane-view illustrating the tray of the optical disk player on which a large-sized disk is mounted.

In order to prevent collision of the tray main body 11 and the outer circumference of the disk 15 when the mounted disk 15 is rotated, the large-sized mounting portion 20 is formed so as to be greater than the disk 15.

In addition, it is general to have a gap of 1.75 mm between the front wall 21 of the large-sized mounting portion 20 and the disk 15.

FIG. 3 is a graph showing measuring results of a disk's rotational speed to axial displacement in the operation of the tray in FIG. 1.

In FIG. 3, a horizontal axis is a disk's rotational speed (Hz), and a vertical axis is z-axial displacement (hereinafter referred to as 'axial displacement).

In the results, because a disk having small variable mass unbalance is used, significant vibration does not occur in a range before flutter occurrence. However, approximately over 160 Hz, vibration of the disk generates displacement much greater than general resonance, the vibration has a bad influence upon reproducing/recording of the disk. The rotational speed of 160 Hz is much lower that the speed of the fifty-two times driver of which speed is 173 Hz. Thus the flutter occurring at the speed of 160 Hz may cause wrong operation, damage the disk and endanger user safety, when the above-described tray is used in fifty-two times driver.

SUMMARY OF THE INVENTION

In order to solve the above-mentioned problem, in a tray of an optical disk player including a disk mounting portion on which an optical disk is stably mounted; a front wall formed on the front of a tray to surround the disk mounting portion; and a rear wall formed on the rear of the tray to surround the disk mounting portion, a tray of an optical disk player in accordance with the present invention includes a front wall formed so as to have a distance from the center of a spindle to the front wall not less than a value obtained by adding 2.75 mm to a radius of a large-sized disk and not greater than a distance from the center of the spindle to a tray front end.

In the present invention, a rear wall is formed so as to have a distance from the center of a spindle to the rear wall not less than a value obtained by adding 2.75 mm to a radius of a large-sized disk and not greater than a distance from the center of the spindle to a tray rear end.

In addition, the tray of the optical disk player further includes a disk mounting protrusion formed on the disk mounting portion in order to make an inner end of the disk mounting protrusion be contacted with the outer circumference of a disk mounted onto the center of the spindle.

And, a top surface of the disk mounting protrusion is downwardly slant toward the center of the spindle.

In the meantime, the tray of the optical disk player can further include a mounting rib stepped-formed on the front wall in order to make a lower inner portion of the mounting rib be contacted with the outer circumference of a disk mounted onto the center of the spindle.

In addition, a top surface the mounting rib is downwardly slant toward the center of the spindle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a perspective view illustrating an optical disk player in accordance with the conventional art;

FIG. 2 is a schematic plane-view illustrating the tray of the optical disk player on which a large-sized disk is mounted;

FIG. 3 is a graph showing measuring results of a disk's rotational speed to axial displacement in the operation of the tray in FIG. 1;

DETAILED DESCRIPTION OF THE PREFERRED EMBODIMENT

Hereinafter, the preferred embodiments of the present invention will be described with reference to accompanying drawings.

Figure 1:
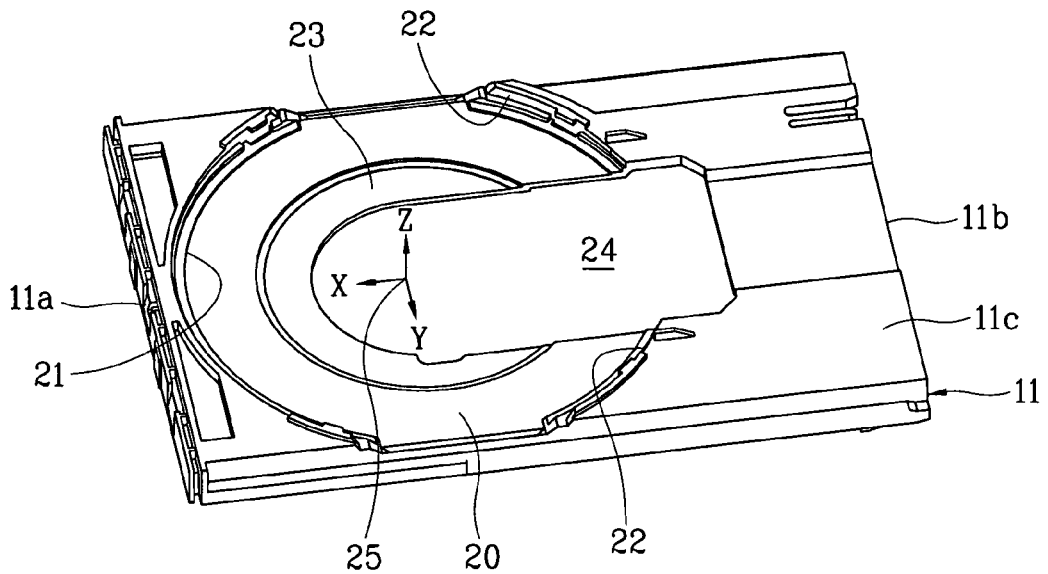
FIGS. 1~3 illustrate a structure of a tray of an optical disk player in accordance with the conventional art.
Figure 2:
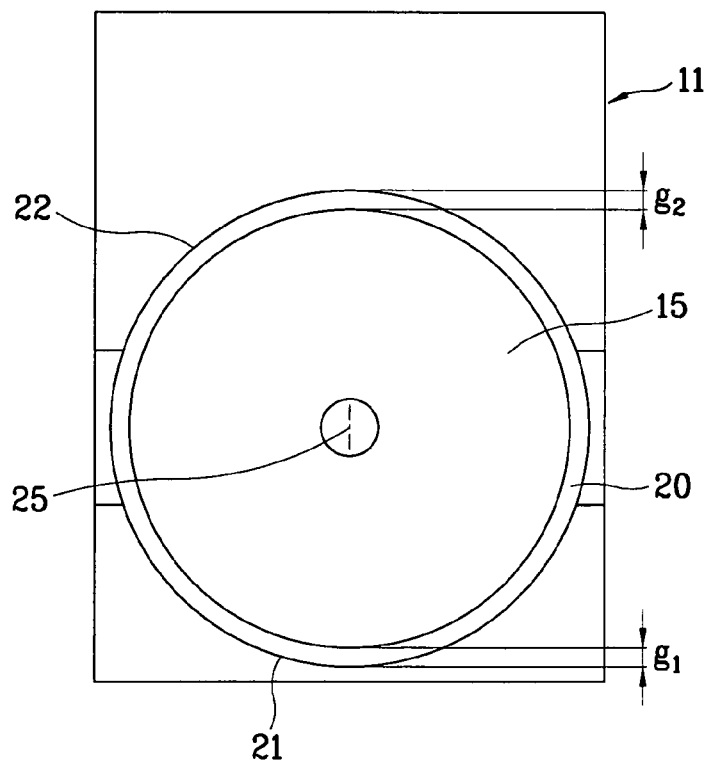
Figure 3:
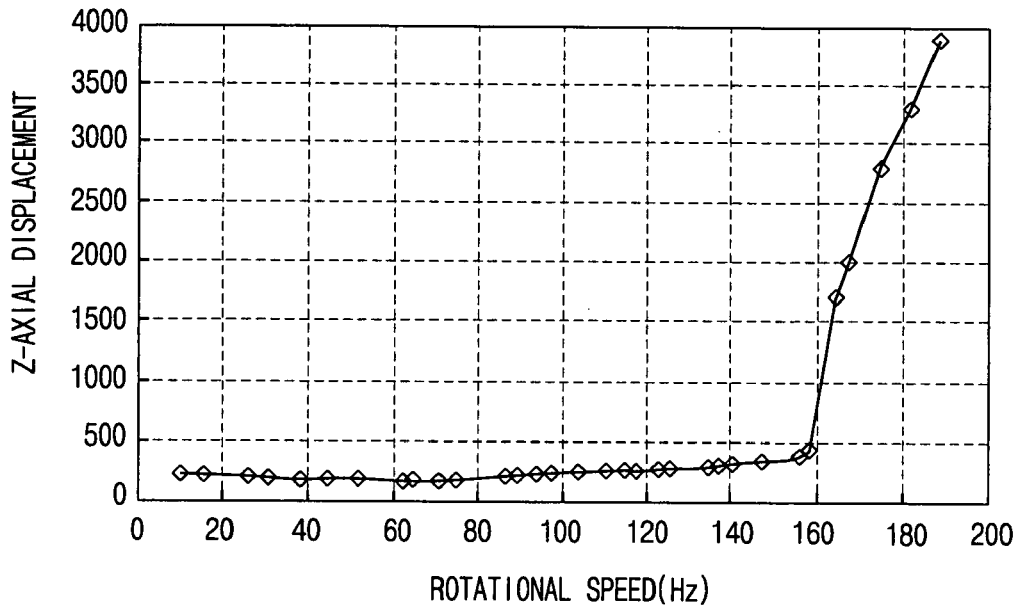
Figure 4:
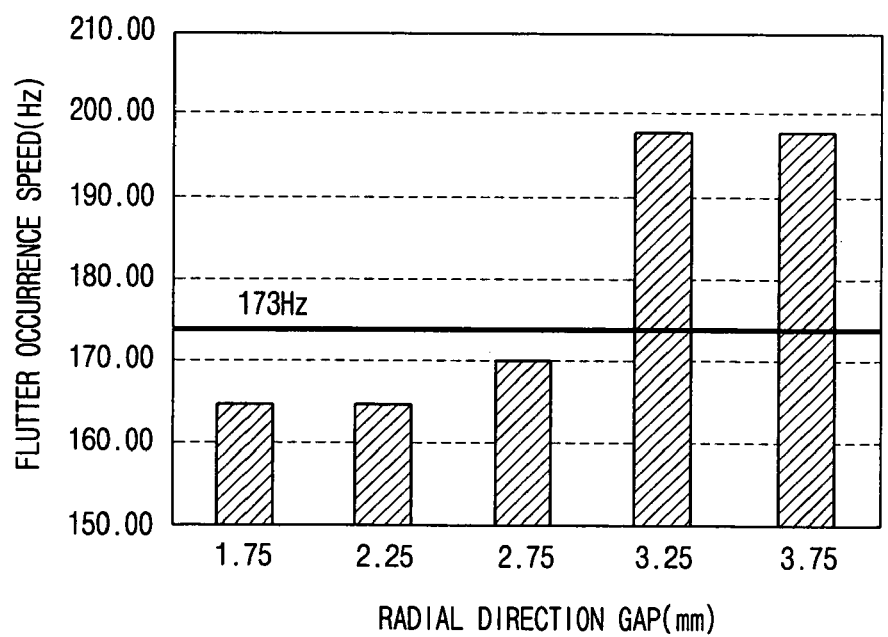
FIG. 4 is a graph showing a flutter occurrence speed according to increase of a gap between a large-sized disk mounting portion and a disk.

FIG. 4 is a graph showing a flutter occurrence speed according to increase of a gap between a large-sized disk mounting portion 20 and a disk 15.

In the graph, a horizontal axis indicates a size (mm) of a gap (g1) between the large-sized disk mounting portion 20 and the disk 15, and a vertical axis indicates a flutter occurrence speed (Hz).

As shown in FIG. 4, when a gap (g1) is 2.75 mm, a flutter occurrence speed is increased, when a gap (g1) is not less than 3.25 mm, a flutter occurrence speed is increased rapidly.

Basically, in the tray, flutter occurs because the disk is strongly coupled to air flowing, it is mainly influenced by air flowing between the bottom of the disk and the top of the disk mounting portion 20. Accordingly, by lowering a high pressure and a flowing speed of the air between the disk and the tray, coupled vibration between the disk and the air flowing can be lowered, and accordingly flutter can be reduced. In the present invention, by increasing a gap (g1) between the front wall 21 of the large-sized disk mounting portion and the disk 15, coupled vibration between the disk and the air can be reduced.

Figure 5:
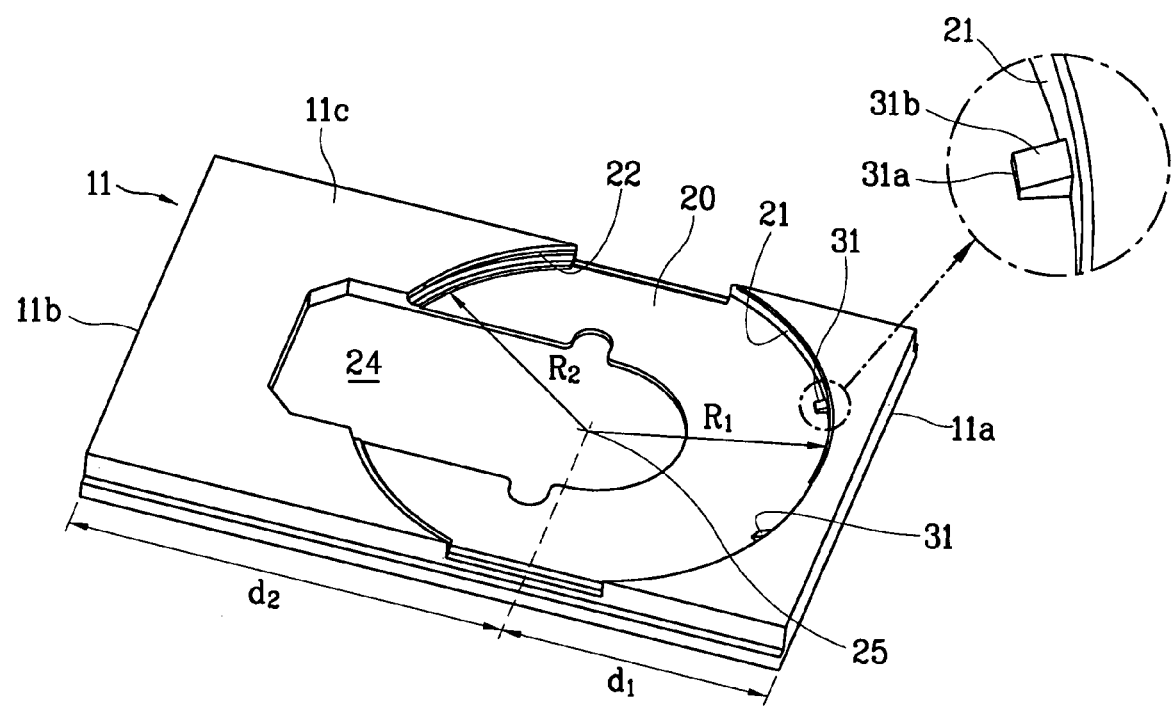
FIG. 5 is a perspective view illustrating a tray of an optical disk player in accordance with a first embodiment of the present invention.
Figure 6:
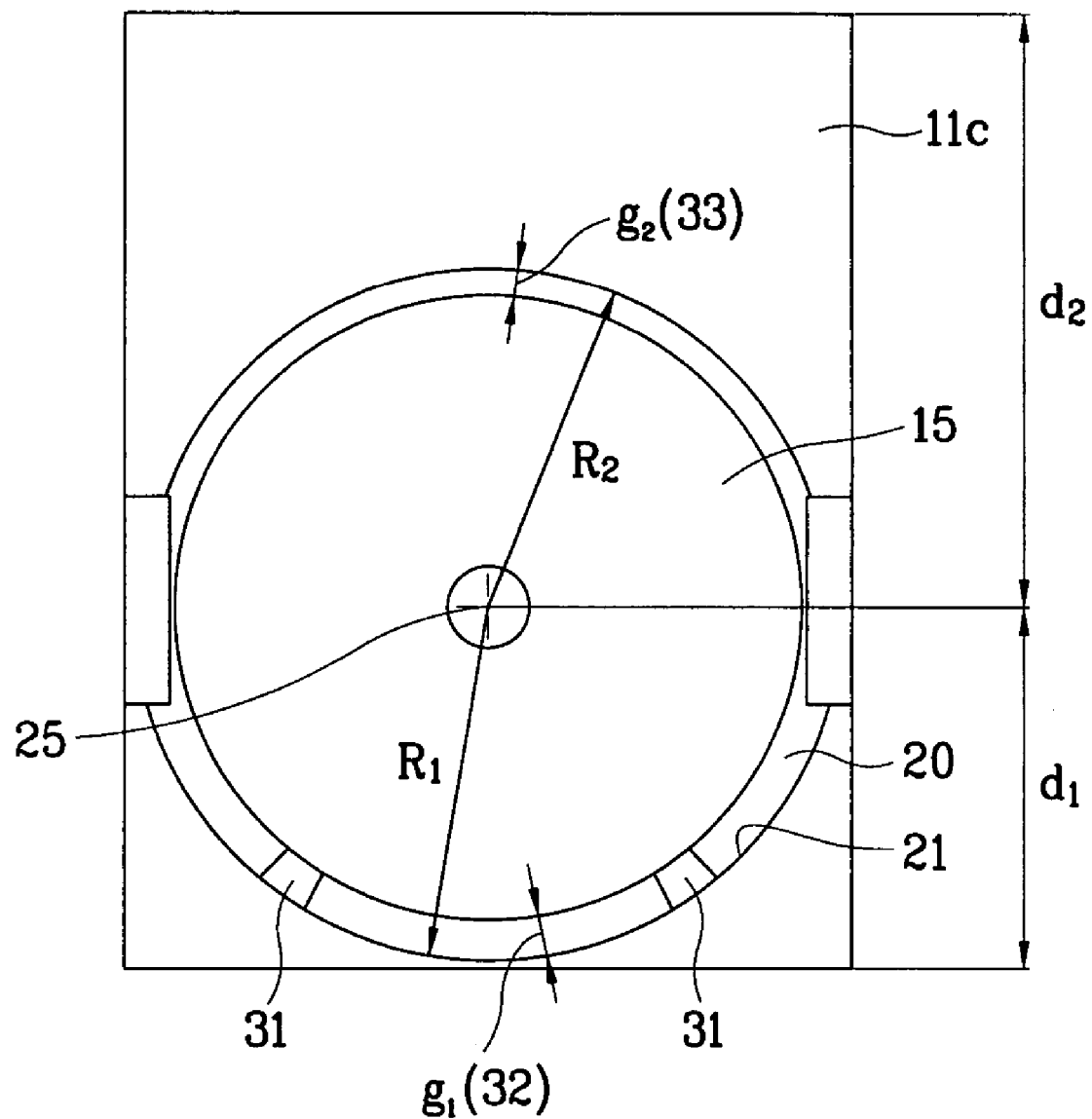
FIG. 6 is a schematic plane-view illustrating the tray of the optical disk player in FIG. 5 on which a large-sized disk is mounted.

FIG. 5 is a perspective view illustrating a tray of an optical disk player in accordance with a first embodiment of the present invention, and FIG. 6 is a schematic plane-view illustrating the tray of the optical disk player in FIG. 5 on which a large-sized disk is mounted.

As depicted in FIGS. 5 and 6, the optical disk player in accordance with the first embodiment of the present invention includes a tray main body 11 consisting of the tray front end 11a, the tray rear end 11b and the top tray 11c; a disk mounting portion 20 depressed on the top tray 11c centering around the center of a spindle 25 as a concentric circle; a spindle opening 24 pierced-formed on the top tray 11c so that a optical pick-up (not shown) can approach to the disk mounted on the tray; and a disk mounting protrusion 31 formed on the disk mounting portion 20 in which an inner end 31a of the mounting protrusion 31 is contacted to the outer circumference of the disk 15 mounted onto the center of the spindle.

A front wall 21 is formed on the front of the disk mounting portion 20, and a rear wall 22 is formed on the rear of the disk mounting portion 20.

A front flutter preventing portion 32 is formed between the front wall 21 and the outer circumference of the mounted large-sized disk, and a rear flutter preventing portion 33 is formed between the rear wall 22 and the outer circumference of the mounted large-sized disk.

The front flutter preventing portion is not less than 2.75 mm, In more detail, a distance (R1) from the center of the spindle 25 to the front wall is not less than a value obtained by adding 2.75 mm to a radius of a large-sized disk and not greater than a distance (d1) from the center of the spindle 25 to the tray front end 11a.

In addition, the rear flutter preventing portion 33 is not less than 2.75 mm. In more detail, a distance (R2) from the center of the spindle 25 to the rear wall is not less than a value obtained by adding 2.75 mm to a radius of a large-sized disk and not greater than a distance (d2) from the center of the spindle 25 to the tray rear end 11b.

A top portion 31b of the disk mounting protrusion 31 is slant-formed toward the center of the spindle 25.

Hereinafter, the operation of the tray of the optical disk player in accordance with the first embodiment of the present invention will be described.

When the optical disk is mounted onto the tray, the outer circumference of the optical disk 15 is slid on the top portion 31b of the disk mounting protrusion 31 and is contacted with the inner end 31a of the disk mounting protrusion 31. Accordingly, the center of the optical disk is accurately coincided with the center of the spindle 25, and accordingly the optical disk can be mounted accurately by a spindle motor.

In addition, because a distance between the outer circumference of the disk 15 and the front wall 21 is not less than 2.75 mm, as shown in FIG. 4, a flutter occurrence speed is considerably increased.

Accordingly, although the optical disk player has a high reproducing/recording speed, by preventing occurrence of flutter, error in disk reproducing/recording can be lowered, noise and wrong operation can be prevented.

Figure 7:
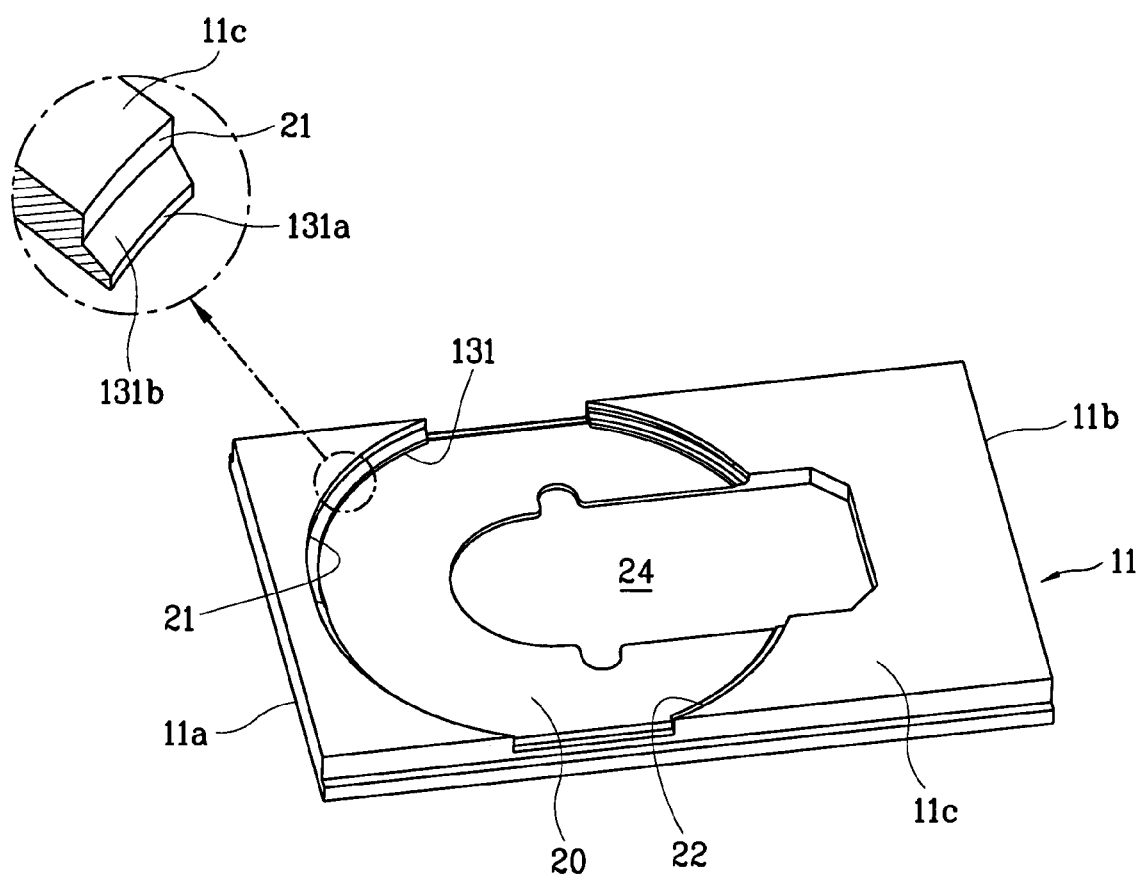
FIG. 7 is a perspective view illustrating a tray of an optical disk player in accordance with a second embodiment of the present invention.

FIG. 7 is a perspective view illustrating a tray of an optical disk player in accordance with a second embodiment of the present invention.

In the second embodiment of the present invention, in substitute for the mounting protrusion 31 in accordance with the first embodiment, a mounting rib 131 is formed. The rest parts are the same with the first embodiment.

The mounting rib 131 is stepped-formed on the front wall 21 in order to make a lower internal portion 131a of the mounting rib 131 be contacted with the outer circumference of the disk mounted on the center of the spindle.

In addition, a top portion 131b of the mounting rib 131 is downwardly slant toward the center of the spindle.

The mounting rib 131 is the same with the mounting protrusion 31 of the first embodiment, but, because it is formed on the whole front wall 21, the optical disk can be mounted more stably.

As described-above, in the present invention, by increasing a flutter occurrence speed, although the optical disk player has a high recording/reproducing speed, occurrence of flutter can be prevented, and accordingly it is possible to reduce error in disk reproducing/recording and prevent noise occurrence and wrong operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A tray of an optical disk player, comprising:
   a tray main body having a tray front end, a tray rear end, and a tray top surface;
   a disk mounting portion formed on the tray main body such that an optical disk is stably mounted thereon;
   a front wall formed on the tray front end to surround the disk mounting portion;
   a rear wall formed on the tray rear end to surround the disk mounting portion; and
   a disk mounting protrusion formed on the disk mounting portion in order to make an inner end of the disk mounting protrusion be in contact with the outer circumference of the optical disk mounted onto the center of a spindle,
   wherein the a front wall is formed so-as to have a distance from the center of the a spindle to the front wall not less than a value obtained by adding 2.75 mm % to a radius of a large-sized disk and not greater than a distance from the center of the spindle to the tray front end.

2. The tray of claim 1, wherein the rear wall is formed so as to have a distance from the center of a spindle to the rear wall not less than a value obtained by adding 2.75 mm to a radius of a large-sized disk and not greater than a distance from the center of the spindle to the tray rear end.

3. The tray of claim 2, further comprising:
   a mounting rib stepped-formed on the rear wall in order to make a lower inner portion of the mounting rib be contacted with the outer circumference of a disk mounted onto the center of the spindle.

4. The tray of claim 3, wherein a top surface of the mounting rib is downwardly slanted toward the center of the spindle.

5. The tray of claim 1, wherein a top surface of the disk mounting protrusion is downwardly slanted toward the center of the spindle.

6. A tray of an optical disk player, comprising:
   a tray main body having a tray front end, a tray rear end, and a top surface;
   a disk mounting portion formed on the tray main body such that an optical disk is stably mounted thereon;
   a front wall formed on the tray front end to surround the disk mounting portion;
   a rear wall formed on the tray rear end to surround the disk mounting portion; and
   a mounting rib stepped-formed on the front wall in order to make a lower inner portion of the mounting rib be in contact with the outer circumference of a disk mounted onto the center of a spindle,
   wherein the front wall is formed to have a distance from the center of the spindle to the front wall not less than a value obtained by adding 2.75 mm to a radius of a large-sized disk and not greater than a distance from the center of the spindle to a front end of the tray main body.

7. The tray of claim 6, wherein a top surface of the mounting rib is downwardly slant toward the center of the spindle.

8. A tray of an optical disk player comprising:
   a tray main body having a tray front end, a tray rear end, and a tray top surface;
   a disk mounting portion formed on the tray main body such that an optical disk is stably mounted thereon;
   a front wall formed on the tray front end to surround the disk mounting portion;
   a rear wall formed on the tray rear end to surround the disk mounting portion; and
   a disk mounting protrusion formed on the disk mounting portion in order to make an inner end of the disk mounting protrusion be in contact with the outer circumference of the optical disk mounted onto the center of the spindle,
   wherein a the rear wall is formed to have a distance from the center of a spindle to the rear wall not less than a value obtained by adding 2.75 mm to a radius of a large-sized disk and not greater than a distance from the center of the spindle to the tray rear end.

* * * * *